US009174238B2

(12) United States Patent
Cho et al.

(10) Patent No.: US 9,174,238 B2
(45) Date of Patent: Nov. 3, 2015

(54) PARTICLES HAVING PERMANENT DIPOLE MOMENT, FILMS INCLUDING THE PARTICLES, AND METHODS OF PREPARING THE FILMS

(75) Inventors: Kyung-sang Cho, Gwacheon-si (KR); Dae-young Chung, Yongin-si (KR); Sang-jin Lee, Anyang-si (KR)

(73) Assignee: SAMSUNG ELECTRONICS CO., LTD. (KR)

( * ) Notice: Subject to any disclaimer, the term of this patent is extended or adjusted under 35 U.S.C. 154(b) by 850 days.

(21) Appl. No.: 13/017,497

(22) Filed: Jan. 31, 2011

(65) Prior Publication Data
US 2012/0037851 A1    Feb. 16, 2012

(30) Foreign Application Priority Data

Aug. 13, 2010 (KR) .......................... 10-2010-0078491

(51) Int. Cl.
| G02F 1/00 | (2006.01) |
| B05D 3/14 | (2006.01) |
| B82Y 30/00 | (2011.01) |
| B05D 3/12 | (2006.01) |
| B05D 5/06 | (2006.01) |
| B05D 5/12 | (2006.01) |
| G02F 1/167 | (2006.01) |

(52) U.S. Cl.
CPC . B05D 3/14 (2013.01); B82Y 30/00 (2013.01); B05D 3/12 (2013.01); B05D 5/061 (2013.01); B05D 5/12 (2013.01); G02F 2001/1678 (2013.01)

(58) Field of Classification Search
CPC G02F 2001/01791; B05D 5/12; B05Y 30/00; Y02E 10/543
USPC ............ 252/301.6 R, 301.4 F, 500; 428/402, 428/404; 427/76
See application file for complete search history.

(56) References Cited

U.S. PATENT DOCUMENTS

| 7,358,525 | B2 | 4/2008 | Lee |
| 7,538,329 | B2* | 5/2009 | Chen et al. ............... 250/370.11 |
| 2003/0216638 | A1 | 11/2003 | Dharmakumar et al. |
| 2006/0169971 | A1* | 8/2006 | Cho et al. ........................ 257/14 |
| 2007/0063154 | A1* | 3/2007 | Chen et al. ................. 250/483.1 |
| 2009/0169866 | A1 | 7/2009 | Ostafin et al. |
| 2012/0049119 | A1* | 3/2012 | Greytak et al. ......... 252/301.6 S |

FOREIGN PATENT DOCUMENTS

KR        1020090083162 A      3/2009

OTHER PUBLICATIONS

Xiaogang Peng et al., "Epitaxial Growth of Highly Luminescent CdSe/CdS Core/Shell Nanocrystals with Photostability and Electronic Accessibility", J. Am. Chem. Soc., 1997, 119, 7019-7029.*
"Dipole-Dipole Interactions in Nanoparticle Superlattices", Dmitri V. Talapin and Elena V. Shevchenko, American Chemical Society 2007, vol. 7, No. 5 1213-1219.
"Millmeter wave absorption by confined acoustic modes in CdSe/CdTe core-shell quantum dots", Tzu-Ming Liu' et al, Journal of Physics, 2007, Conf. Ser. 92 012039.
"On the Origin of a Permanent Dipole Moment in Nanocrystals with a Cubic Crystal Lattice: Effects of Truncation, Stabilizers, and Medium for CdS Tetrahedral Homologues", Sachin Shanbhag and Nicholas A. Kotov, The Journal of Physical Chemistry, 2006, 110 (25), pp. 12211-12217.

* cited by examiner

Primary Examiner — Douglas McGinty
(74) Attorney, Agent, or Firm — Cantor Colburn LLP

(57) ABSTRACT

A particle has a permanent dipole moment, a film includes the particle, and a method of forming the film includes aligning the particle on a surface. The particle has a permanent dipole moment and includes heterogeneous materials, wherein a positive pole is located in a first material and a negative pole is located in a second material different from the first material. The method includes aligning a particle such that the particle has one dipole moment direction. The film includes the aligned particles.

13 Claims, 5 Drawing Sheets

PARTICLES HAVING PERMANENT DIPOLE MOMENT, FILMS INCLUDING THE PARTICLES, AND METHODS OF PREPARING THE FILMS

CROSS-REFERENCE TO RELATED APPLICATIONS

This application claims priority to Korean Patent Application No. 10-2010-0078491, filed on Aug. 13, 2010, and all the benefits accruing therefrom under 35 U.S.C. 119, the content of which in its entirety is herein incorporated by reference.

BACKGROUND

1. Field

The present disclosure relates to particles having a permanent dipole moment, films including the particles, and methods of preparing the films, and more particularly, to particles having a permanent dipole moment and including heterogeneous materials including one material having a positive pole and another material having a negative pole, films having the particles, and methods of preparing the films.

2. Description of the Related Art

In materials for certain applications requiring compounds having a net dipole, controlling the dipole moment may have an important effect on the electrical and/or optical characteristics of the material. However, no effective methods for permanently controlling dipole moment in a nanoparticle or a semiconductor quantum dot has yet been developed.

SUMMARY

Provided herein are, in an embodiment, particles having a permanent dipole moment and including heterogeneous materials including one material having a positive pole and another material having a negative pole.

Also provided is, in an embodiment, a film including the particles.

Provided are methods of preparing the films, the methods including aligning particles such that the particles have one dipole moment direction.

Additional aspects will be set forth in part in the description which follows and, in part, will be apparent from the description, or may be learned by practice of the presented embodiments.

According to an embodiment, a particle having a permanent dipole moment includes a first material and a second material different from the first material, wherein a positive pole is located in the first material and a negative pole is located in the second material.

According to another embodiment, a particle having a permanent net dipole moment includes a first material; a second material that is different from the first material; a first ligand bonded to the first material; and a second ligand bonded to the second material and different from the first ligand, wherein a positive pole is located on a first side of the particle having the first ligand and a negative pole is located on a second side of particle having the second ligand.

The first ligand and the second ligand have the same dipole moment direction.

Alternatively, the first ligand and the second ligand have different dipole moment directions and different dipole moment magnitudes.

At a heterojunction of the first material and the second material, a conduction band offset value may be different from a valence band offset value.

A conduction band energy and a valence band energy of the first material may be higher than a conduction band energy and a valence band energy of the second material.

A conduction band energy of the first material may be higher than a conduction band energy of the second material, and a valence band energy of the first material may be lower than a valence band energy of the second material.

At a heterojunction of the first material and the second material, a conduction band offset value is identical to a valence band offset value, the conduction band offset value and the valence band offset value are each not zero, and a band gap value of the first material may be identical to a band gap value of the second material.

An amount of the first material may be from about 1 to about 99 parts by weight and an amount of the second material may be from about 99 to about 1 parts by weight, based on the combined weight of the first and second materials.

The particle has a core/shell structure including a core portion including a homogeneous material or a mixed material and a shell portion including the first material and the second material.

The particle may be a nanoparticle or a semiconductor quantum dot.

According to another embodiment, a film includes the particle described above.

According to another embodiment, a method of preparing a film includes aligning the particle described above such that the particle has one dipole moment direction.

In the aligning of the particle, the particle may be melted using a high boiling point solvent having a boiling point of about 80 to about 350° C. to prepare a film formation composition and the film formation composition is dried.

In the aligning of the particle, the particle is mixed with a solvent-non solvent mixed solution to prepare a film formation composition and the film formation composition is dried.

In the aligning of the particle, the particle is aligned by oscillating the particle.

In the aligning of the particle, the particle is aligned by applying a voltage pulse to the particle.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Figure 1:
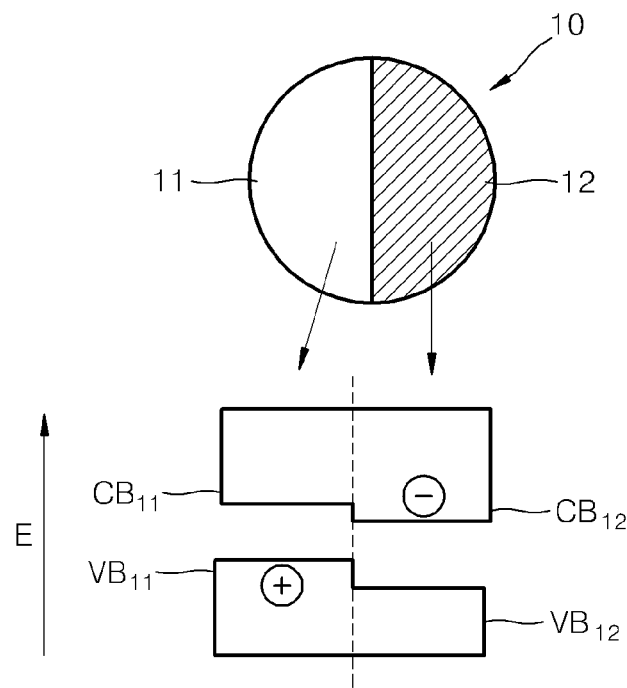
FIG. 1 shows a view of a particle having a permanent dipole moment according to an example embodiment, and of a band diagram of the particle.

Reference will now be made in detail to embodiments, examples of which are illustrated in the accompanying drawings, wherein like reference numerals refer to the like elements throughout. In this regard, the present embodiments may have different forms and should not be construed as being limited to the descriptions set forth herein.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, regions, integers, steps, operations, elements, and/or components, but do not preclude the presence or addition of one or more other features, regions, integers, steps, operations, elements, components, and/or groups thereof. All ranges and endpoints reciting the same feature are independently combinable.

It will be understood that when an element is referred to as being "on" another element, it can be directly on the other element or one or more intervening elements may be present. Also as used herein, the term "disposed on" describes the fixed structural position of an element with respect to another element, and unless otherwise specified should not be construed as constituting the action of disposing or placing as in a method step. As used herein, the term "and/or" includes any and all combinations of one or more of the associated listed items.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower", can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

It will be understood that, although the terms first, second, third, etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"Heterojunction", as used herein, describes the interfacial region between two or more different materials contacting each other. The heterojunction may be formed where contacting surfaces of two or more dissimilar materials are lattice matched, as where the dissimilar materials are each crystalline and have the same or compatible crystalline lattices; or the dissimilar materials may not be matched as to their lattice structures, as where one or both materials are amorphous, or where the dissimilar materials are crystalline but do not have matching or compatible lattices. It is preferred that the crystal lattices are lattice matched.

Accordingly, the embodiments are described below with reference to the figures, to explain aspects of the present description.

FIG. 1 shows a view of a particle 10 having a permanent dipole moment according to an embodiment of the present invention and a band diagram of the particle 10.

The particles may be a nanoparticle or a semiconductor quantum dot. Nanoparticles include any particles having an average particle size of less than about 1,000 nm, for example, about 0.1 to 100 nm. Non-limiting examples of nanoparticles include metals such as Al, Au, Sn, Ti, Ta, W, Fe, Ni, Co, Cr, Pt, Cu, In, Zn, Zr, or the like; polymers including polyolefins such as polyethylene or polypropylene, polyacrylates, polystyrenes, polycarbonates, polyimides, polyamides, polyesters, biopolymers such as proteins, nucleic acids, or the like; and metal oxides such as $SiO_2$, $Al_2O_3$, $TiO_2$, or the like. Any material having a dipole moment is contemplated as a nanoparticle.

The quantum dot compound may be a) a first element selected from Group 2, 12, 13 and 14 of the Periodic Table of Elements and a second element selected from Group 16; b) a first element selected from Group 13 and a second element selected from Group 15; c) an element selected from Group 14; or a composite comprising one or more of the forgoing substances having core-shell structures.

Specific examples of the quantum dot compound include MgO, MgS, MgSe, MgTe, CaO, CaS, CaSe, CaTe, SrO, SrS, SrSe, SrTe, BaO, BaS, BaSe, BaTe, ZnO, ZnS, ZnSe, ZnTe, CdO, CdS, CdSe, CdTe, HgO, HgS, HgSe, HgTe, AgO, AgS, AgSe, AgTe, $Al_2O_3$, $Al_2S_3$, $Al_2Se_3$, $Al_2Te_3$, $Ga_2O_3$, $Ga_2S_3$, $Ga_2Se_3$, $Ga_2Te_3$, $In_2O_3$, $In_2S_3$, $In_2Se_3$, $In_2Te_3$, $SiO_2$, $GeO_2$, $SnO_2$, SnS, SnSe, SnTe, PbO, $PbO_2$, PbS, PbSe, PbTe, AlN, AlP, AlAs, AlSb, GaN, GaP, GaAs, GaSb, InN, InP, InAs, InSb, BP, Si and Ge, and composites of one or more of the forgoing materials having core-shell structures.

Examples of single quantum dot compounds include AgSe, CdSe, CdTe, CdS, ZnSe, ZnS, InP, InAs, GaN, GaP, GaAs, HgTe, Si and Ge. Examples of the composites having core-shell structures include CdS/ZnSe, CdS/ZnS, CdSe/ZnS, CdSe/CdS, CdSe/ZnSe, CdTe/ZnS, CdTe/CdSe, CdSe/ZnTe, and the like.

Referring to FIG. 1, the particle 10 according to the present embodiment includes a first material 11 and a second material 12 that is of a different material type from the first material 11. A positive pole of the permanent dipole moment is located in the first material 11 and a negative pole of the permanent dipole moment is located in the second material 12.

The bottom portion of FIG. 1 shows a band diagram for the particle 10. Referring to the band diagram, the conduction band $CB_{11}$ energy and valence band $VB_{11}$ energy of the first material 11 are higher than the conduction band $CB_{12}$ energy and valence band $VB_{12}$ energy of the second material 12, respectively. In addition, at the heterojunction between the first material 11 and the second material 12, the conduction band offset value (portion indicated by "−") may be different from the valence band offset value (portion indicated by "+"). As shown in FIG. 1, the "−" portion of $CB_{12}$ is more closely matched in overall energy (E, where increasing energy is shown by the direction of the arrow) with the "+" portion of $VB_{11}$. It will be appreciated that in general, energy transfer from the valence band to the conduction band is facilitated where the energy levels are more closely matched. Accordingly, at the heterojunction, electrons flow to the conduction band $CB_{12}$ of the second material 12 from the conduction band $CB_{11}$ of the first material 11 so that more electrons are present in the conduction band $CB_{12}$ than in the conduction band $CB_{11}$. Also, holes flow to the valence band $VB_{11}$ of the first material 11 from the valence band $VB_{12}$ of the second material 12 so that more holes are present in the valence band $VB_{11}$ than in the valence band $VB_{12}$. Thus, charge localization may occur in the particle 10. Thus, in the particle 10, a positive pole is located in the first material 11 and a negative pole is located in the second material 12, thereby allowing the particle 10 to have a permanent dipole moment.

In the present specification, the term 'conduction band offset value' refers to a conduction band energy difference between different materials at a heterojunction thereof, and the term 'valence band offset value' refers to a valence band energy difference between different materials at a heterojunction thereof. In this regard, in FIG. 1, the higher the conduction band offset value (i.e., the greater the difference between $CB_{11}$ and $CB_{12}$) is, the more the electrons are localized in $CB_{12}$, and the higher the valence band offset value (i.e., the greater the difference between $VB_{11}$ and $VB_{12}$), the more the holes are localized in $VB_{11}$.

The particle 10 having the band diagram illustrated in FIG. 1, for example, may include CdTe as the first material 11 and CdSe as the second material 12.

Figure 2:
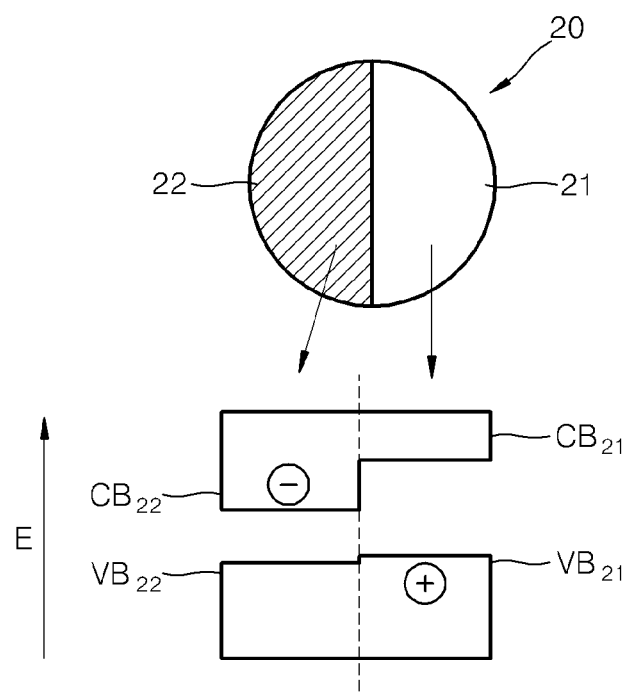
FIG. 2 shows a view of a particle having a permanent dipole moment according to another embodiment and a band diagram of the particle.

FIG. 2 shows a view of a particle 20 having a permanent dipole moment according to another embodiment and a band diagram of the particle 20.

Referring to FIG. 2, the particle 20 according to the present embodiment includes a first material 21 and a second material 22 that is of a different material type from the first material 21. A positive pole of the permanent dipole moment is located in the first material 21 and a negative pole of the permanent dipole moment is located in the second material 22.

The bottom part of FIG. 2 shows the band diagram of the particle 20. Referring to the band diagram, the conduction band $CB_{21}$ energy and valence band $VB_{21}$ energy of the first material 21 are higher than a conduction band $CB_{22}$ energy and a valence band $VB_{22}$ energy of the second material 22, respectively. In addition, at a heterojunction between the first material 21 and the second material 22, the conduction band offset value (portion indicated by "−") may be different from a valence band offset value (portion indicated by "+"). As shown in FIG. 2, the "−" portion of $CB_{22}$ is more closely matched in overall energy (E, where increasing energy is shown by the direction of the arrow) with the "+" portion of $VB_{21}$. Accordingly, at the heterojunction, electrons flow to the conduction band $CB_{22}$ of the second material 22 from the conduction band $CB_{21}$ of the first material 21 so that more electrons are present in the conduction band $CB_{22}$ than in the conduction band $CB_{21}$. Also, holes flow to the valence band $VB_{21}$ of the first material 21 from the valence band $VB_{22}$ of the second material 22 so that more holes are present in the valence band $VB_{21}$ than in the valence band $VB_{22}$. It is also seen schematically, that the conduction band $CB_{22}$ is significantly lower in overall energy than the conduction band $CB_{21}$; however, the difference between the lower energy valence band $VB_{22}$, and the higher energy valence band $VB_{21}$, is not as great as for the conduction bands, and hence there may be a strong preference for electrons present in conduction band $CB_{22}$, but less preference for localization of holes in the valence band $VB_{21}$. Thus, in the particle 20, a positive pole is located in the first material 21 and a negative pole is located in the second material 22, thereby allowing the particle 20 to have a permanent dipole moment.

For example, the particle 20 having the band diagram illustrated in FIG. 2 may include ZnTe as the first material 21 and CdTe as the second material 22.

Although not illustrated in FIGS. 1 and 2, a particle according to another embodiment of the present invention may include a first material having a conduction band energy higher than a reference conduction band energy $E_{CB,R}$ and a valence band energy lower than a reference valence band energy $E_{VB,R}$ (where it is noted that $E_{CB,R}$ and $E_{VB,R}$ refer to portions of the schematic energy diagrams corresponding to the valence and conduction band energies along the continuum of energy levels E described above) and a second material having a conduction band energy lower than the reference conduction band energy $E_{CB,R}$ and a valence band energy higher than the reference valence band energy $E_{VB,R}$. Also, at the heterojunction between the first material and the second material, a conduction band offset value is different from a valence band offset value.

Also, although not illustrated in FIGS. 1 and 2, in regard to a particle according to another embodiment, at a heterojunction of the first and second materials, the conduction band offset value and the valence band offset value may be identical to each other and are not zero, and a band gap value of the first material may be identical to a band gap value of the second material. In this regard, the conduction band energy and the valence band energy of the first material may be higher or lower than the conduction band energy and the valence band energy of the second material, respectively. In the present specification, the term "band gap value" refers to the energy difference between the highest energy level of the valence band and the lowest energy level of the conduction band for each of the first material and the second material.

Referring to FIGS. 1 and 2, in the particles 10 and 20, amounts (i.e., particle size fraction) of the first materials 11 and 21 are substantially the same as amounts (i.e., particle size fraction) of the second materials 12 and 22, respectively, but the present invention is not limited thereto. For example, the amounts of the first materials 11 and 21 may be different from the amounts of the second materials 12 and 22, respectively. For example, the particles 10 and 20 may include about 1 to about 99 parts by weight of the first materials 11 and 21 and about 99 to about 1 part by weight of the second materials 12 and 22, respectively, based on the total weight of the first and second materials.

Figure 3:
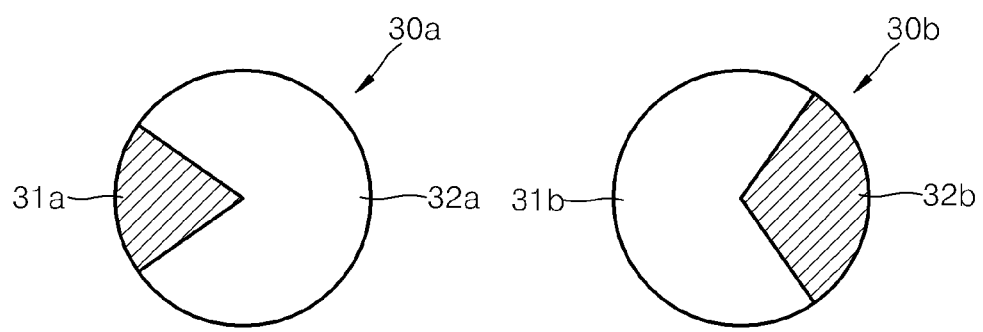
FIG. 3 shows schematic views of particles having a permanent dipole moment according to another embodiment.

FIG. 3 shows schematic views of particles 30a and 30b having a permanent dipole moment according to another embodiment of the present invention.

In FIG. 3, the particle 30a illustrated in the left part of FIG. 3 includes a first material 31a and a second material 32a. An amount of the first material 31a is less than an amount of the second material 32a. The particle 30b illustrated in the right part of FIG. 3 includes a first material 31b and a second material 32b in which an amount of the first material 31b is greater than an amount of the second material 32b.

Referring to FIGS. 1 to 3, the magnitude of the permanent dipole moments may be adjusted, for example, maximized by controlling a composition ratio of each of the particle 10, 20, 30a, and 30b.

Figure 4:
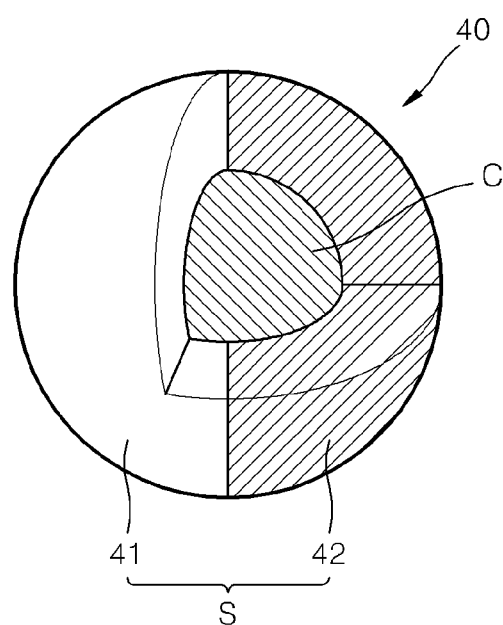
FIG. 4 is an exploded sectional view of a particle having a permanent dipole moment according to another embodiment.

FIG. 4 is an exploded sectional view of a particle 40 having a permanent dipole moment according to another embodiment.

The particle 40 of FIG. 4 includes a core portion C including a homogeneous material or a mixed material and a shell portion S including the first material 41 and the second material 42. In the particle 40 having such a core/shell structure, the shell portion S has a permanent dipole moment based on the same principle described with respect to the particle 10 of FIG. 1 or the particle 20 of FIG. 2.

Figure 5:
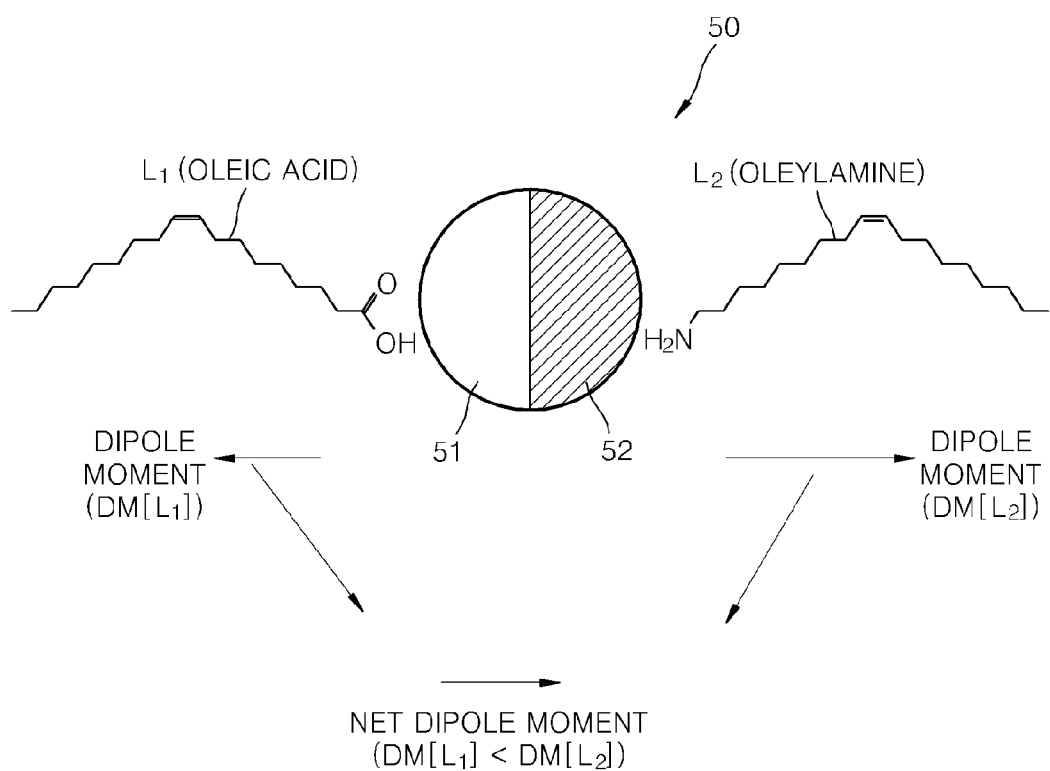
FIG. 5 is a schematic view of a particle having a permanent dipole moment according to another embodiment.

FIG. 5 is a schematic view of a particle 50 having a permanent dipole moment according to another embodiment. That is, the particle 50 has a permanent net dipole moment.

The particle 50 of FIG. 5 includes a first material 51, a second material 52, a first ligand $L_1$, and a second ligand $L_2$. The ligands L1 and L2 may be any ligand suitable for use with the materials used to prepare the particles, and may include those having from 1 to 30 carbon atoms and a functional group such as a carboxylic acid, amide, alkyl or aryl hydroxy, thiol (—SH), sulfide (R—S—R), disulfide (R—S—S—R), sulfite (R—S(O)—R), phosphine, phosphine oxide, or other such functional group. Useful ligands thus include $C_{1-30}$ alkyl carboxylic acids, $C_{2-30}$ alkenyl carboxylic acids, $C_{6-30}$ aryl carboxylic acids, $C_{7-30}$ aryl-alkyl carboxylic acids, $C_{1-30}$ alkyl thiols, $C_{2-30}$ alkenyl thiols, $C_{6-30}$ aryl amines, $C_{7-30}$ aryl-alkyl amines, $C_{1-30}$ alkyl thiols, $C_{2-30}$ alkenyl thiols, $C_{6-30}$ aryl thiols, $C_{7-30}$ aryl-alkyl thiols. Exemplary ligands include carboxylic acids such as dodecyl carboxylic acid (i.e., dodecanoic acid), oleyl carboxylic acid (i.e., oleic acid), benzoic acid, and dodecylbenzene carboxylic acid; amines such as dodecyl amine, oleyl amine, aniline, and p-toluidine; and thiols such as dodecanethiol, stearylthiol, and 4-methylbenzene thiol, or the like.

The first material 51 is different from the second material 52. In addition, the first material 51 may be identical to or different from any one of the first materials previously described and the second material 52 may be identical to or different from any one of the second materials previously described. For example, the first material 51 may be CdSe and the second material 52 may be PbSe. Moreover, the first material 51 and/or the second material 52 may be surface-modified so as to more readily attach a ligand having a high dipole moment thereto.

The first ligand $L_1$ may be bonded to the first material 51 and the second ligand $L_2$ may be bonded to the second material 52. The first ligand $L_1$ may be selectively bonded to the first material 51 and the second ligand $L_2$ may be selectively bonded to the second material 52. "Selectively," as used herein, means that the functionality of the ligand has a high binding affinity for a specific material, such that more than 95%, and in a specific example, more than 99%, of the total number of ligands bond to the specific material preferentially over a material without specific affinity for the functional groups of the ligand. In addition, the first ligand $L_1$ may be of a different compound type from the second ligand $L_2$. The first ligand $L_1$ and the second ligand $L_2$ may be appropriately selected by referring to a substituent constant of a Hammett equation. That is, the substituent constant may be a reference value indicating polarity of a molecule having a certain substituent. For example, the first ligand $L_1$ may be a carboxylic acid such as oleic acid and the second ligand $L_2$ may be a primary amine such as oleylamine.

Referring to FIG. 5, the first ligand $L_1$ has a dipole moment (DM[$L_1$]) indicated by a left-pointing arrow, and the second ligand $L_2$ has a dipole moment (DM[$L_2$]) indicated by a right-pointing arrow, in which the dipole moment of the second ligand $L_2$ is greater than the dipole moment of the first ligand $L_1$. Accordingly, the particle 50 has a net dipole moment (DM[$L_1$]<DM[$L_2$]) indicated by the right-pointing arrow. In this case, in regard to the net dipole moment, a positive pole is located on a first side of the particle 50 having the first ligand $L_1$ and a negative pole is located on a second side of the particle 50 having the second ligand $L_2$.

Figure 6:
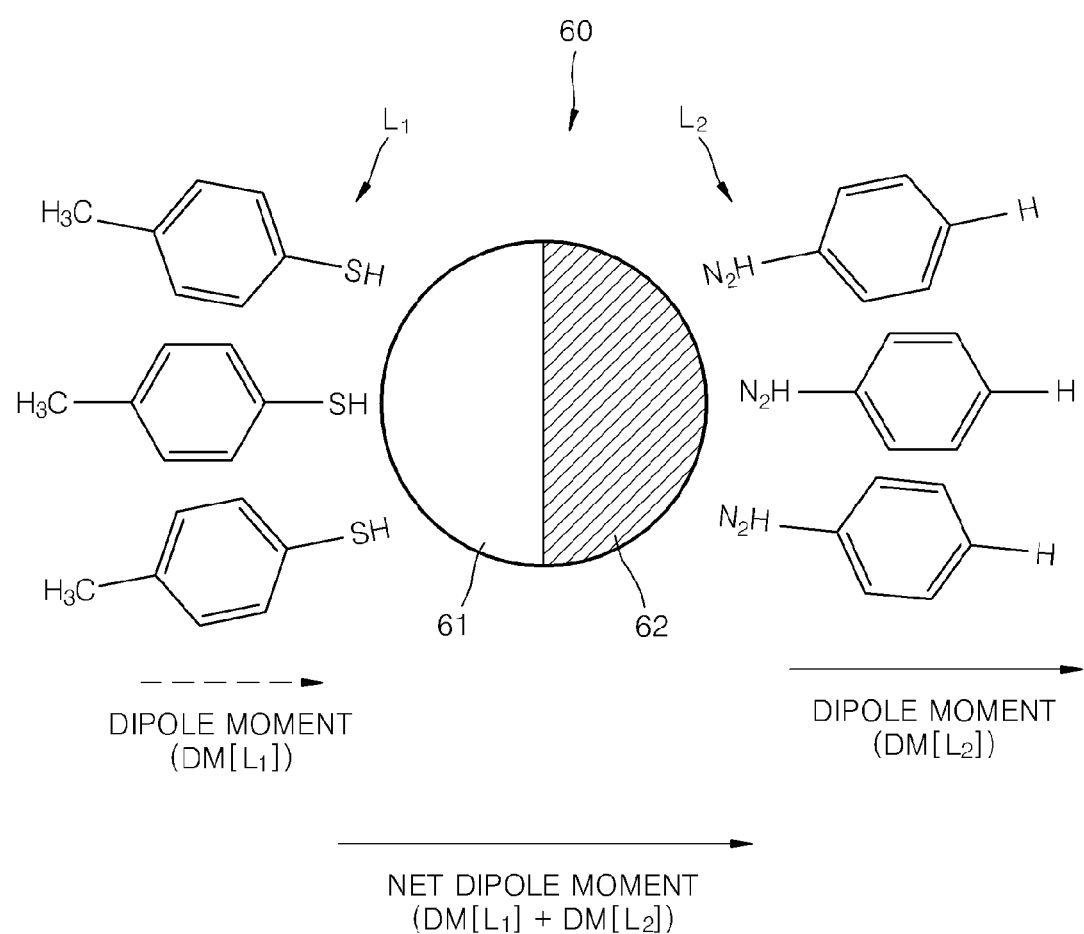
FIG. 6 is a schematic view of a particle having a permanent dipole moment according to another embodiment.

FIG. 6 is a schematic view of a particle 60 having a permanent dipole moment according to another embodiment. That is, the particle 60 has a permanent net dipole moment.

The particle 60 of FIG. 6 includes a first material 61, a second material 62, a first ligand $L_1$, and a second ligand $L_2$.

The first material 61 is of a different material type from the second material 62. In addition, the first material 61 may be identical to or different from any one of the first materials previously described and the second material 62 may be identical to or different from any one of the second materials previously described. For example, the first material 61 may be AgSe and the second material 62 may be CdSe.

The first ligand $L_1$ may be bonded to the first material 61 and the second ligand $L_2$ may be bonded to the second material 62. The first ligand $L_1$ may be selectively bonded to the first material 61 and the second ligand $L_2$ may be selectively bonded to the second material 62. In addition, the first ligand $L_1$ may be of a different compound type from the second ligand $L_2$. For example, the first ligand $L_1$ may be a thiol-containing ligand such as 4-methylthiophenol, and the second ligand $L_2$ may be an amine ligand such as aniline.

Referring to FIG. 6, the first ligand $L_1$ has a weak dipole moment (DM[$L_1$]) indicated by a right-pointing arrow in the left part of FIG. 6 and the second ligand $L_2$ has a strong dipole moment (DM[$L_2$]) indicated by a right-pointing arrow in the right part of FIG. 6. Accordingly, the two different dipole moments in the same direction are combined so that the particle 60 has a net dipole moment (DM[$L_1$]+DM[$L_2$]) indicated by a right-pointing arrow in the bottom part of FIG. 6. In this case, in the net dipole moment, a positive pole is located on a side of the particle 60 having the first ligand $L_1$ and a negative pole is located on a side of the particle 60 having the second ligand $L_2$. In the particle 60 of FIG. 6, the first material 61, the second material 62, the first ligand $L_1$, and the second ligand $L_2$ may be appropriately selected such that the dipole moment direction of the first ligand $L_1$ is identical to the dipole moment direction of the second ligand $L_2$. By doing so, the magnitude of the net dipole moment of the particle 60 may be increased.

A film (not shown) according to an embodiment includes at least one type of the particles previously described above.

Hereinafter, a method of forming the film will be described in detail.

Figure 7:
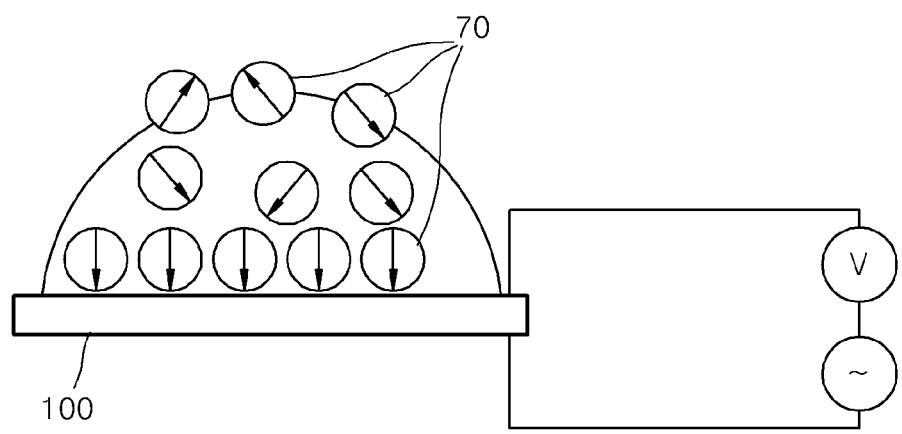
FIG. 7 is a diagram illustrating a method of forming a film according to an embodiment.

FIG. 7 is a diagram illustrating a method of forming the film according to an embodiment.

The method of forming the film includes aligning particles 70 such that the particles 70 have one dipole moment direction.

Referring to FIG. 7, a film formation composition including the particles 70 is coated on a surface of a substrate 100. Originally, the particles 70 have different permanent dipole moment directions. In order to align the particles 70 to have one permanent dipole moment direction, a re-alignment condition may be provided before the particles 70 are sedimented on the substrate 100 and their locations are fixed.

According to an embodiment, the alignment of the particles 70 may be performed by applying an alternating or direct voltage pulse V to the substrate 100 which may be conductive, as illustrated in FIG. 7.

According to another embodiment (not shown), the alignment of the particles 70 may be performed using a film forming composition including solution of the particles 70 in a high boiling point solvent that slowly evaporates when the film forming composition is dried. That is, the alignment of the particles 70 may be performed by preparing a film forming composition by dissolving or suspending the particles 70 in a high boiling point solvent having a boiling point of about 80 to about 350° C. and drying the film forming composition, during which the dipole moments of the particles 70 align due to surface-air interface interactions.

According to another embodiment (not shown), the alignment of the particles 70 may be performed by preparing a film forming composition by mixing the particles 70 with a solvent-non solvent mixed solution and drying the film forming composition. In the solvent-non solvent mixed solution, the amount of the solvent may be from about 90 to about 95 volume-% and the amount of the non solvent may be from about 5 to about 10 volume-%. The solvent-non solvent mixed solution may be a combination of a nonpolar solvent and a polar solvent, such as for example, a combination of octane and octanol or a combination of hexane and ethanol.

According to another embodiment (not shown), the alignment of the particles 70 may be performed by oscillating the particles 70.

As described above, according to the one or more of the above embodiments of the present invention, a particle having a dipole moment with a controlled magnitude is provided. Regarding the particle, control of the dipole moment is important in terms of the electrical and/or optical characteristics of the particle itself, and furthermore, affects a charge transport between particles, and a dipole moment and electrical characteristics of a film including the particle. Physical properties of a film including these particles may be controlled by controlling the dipole moments of particles constituting the film. Aligning particles in one dipole moment direction in a film may affect charge transport and band shift, and when the film is used for manufacturing a device, an electrical property and a charge transport at an interface of the film may be affected and characteristics of a device including the film may also be changed.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A particle having a permanent dipole moment, the particle comprising a first material and a second material different from the first material,
   wherein a positive pole is located in the first material and the first material is located on a first side of the particle,
   wherein a negative pole is located in the second material and the second material is located on a second side of the particle, and
   wherein the particle is a nanoparticle or a semiconductor quantum dot.

2. The particle of claim 1, further comprising
   a first ligand bonded to the first material; and
   a second ligand that is bonded to the second material and is different from the first ligand,
   wherein the positive pole is located on the first side of the particle having the first ligand and the negative pole is located on the second side of the particle having the second ligand.

3. The particle of claim 2, wherein the first ligand and the second ligand have the same dipole moment direction.

4. The particle of claim 2, wherein the first ligand and the second ligand have different dipole moment directions and different dipole moment magnitudes.

5. The particle of claim 1, wherein, at a heterojunction of the first material and the second material, a conduction band offset value is different from a valence band offset value.

6. The particle of claim 5, wherein a conduction band energy and a valence band energy of the first material are higher than a conduction band energy and a valence band energy of the second material, respectively.

7. The particle of claim 5, wherein a conduction band energy of the first material is higher than a conduction band energy of the second material, and a valence band energy of the first material is lower than a valence band energy of the second material.

8. The particle of claim 1, wherein, at a heterojunction of the first material and the second material, a conduction band offset value is identical to a valence band offset value and the conduction band offset value and the valence band offset value are not zero, and a band gap value of the first material is identical to a band gap value of the second material.

9. The particle of claim 8, wherein a conduction band energy and a valence band energy of the first material are higher than a conduction band energy and a valence band energy of the second material, respectively.

10. The particle of claim 1, wherein an amount of the first material is from about 1 to about 99 parts by weight and an amount of the second material is from about 99 to about 1 part by weight, based on the combined weight of the first and second materials.

11. The particle of claim 1, wherein the particle is a nanoparticle or a semiconductor quantum dot.

12. A film comprising the particle according to claim 1.

13. The particle of claim 1, wherein the particle has a core/shell structure comprising a core portion comprising a homogeneous material or a mixed material and a shell portion comprising the first material and the second material.

* * * * *